United States Patent

Vercesi

[11] 4,007,449
[45] Feb. 8, 1977

[54] CONTROL DEVICE FOR LOCAL CONNECTION OF A PERIPHERAL UNIT THROUGH A MODEM INTERFACE FOR REMOTE CONNECTION

[75] Inventor: Giacomo Vercesi, Milan, Italy

[73] Assignee: Honeywell Information Systems Italia, Caluso, Italy

[22] Filed: Oct. 11, 1974

[21] Appl. No.: 514,144

[30] Foreign Application Priority Data
Nov. 9, 1973  Italy .................................. 31096/73

[52] U.S. Cl. .......................................... 340/172.5
[51] Int. Cl.² ...................... G06F 3/04; G06F 3/12
[58] Field of Search ................................ 340/172.5

[56] References Cited

UNITED STATES PATENTS

| | | | |
|---|---|---|---|
| 3,400,375 | 9/1968 | Bowling et al. | 340/172.5 |
| 3,510,843 | 5/1970 | Bennett et al. | 340/172.5 |
| 3,618,037 | 11/1971 | Wollum et al. | 340/172.5 |
| 3,626,375 | 12/1971 | Koziol et al. | 340/172.5 |
| 3,676,858 | 7/1972 | Finch et al. | 340/172.5 |
| 3,680,057 | 7/1972 | Blessin et al. | 340/172.5 |
| 3,697,959 | 10/1972 | Abramson et al. | 340/172.5 |
| 3,750,107 | 7/1973 | Pyne | 340/172.5 |
| 3,771,135 | 11/1973 | Huettner et al. | 340/172.5 |
| 3,772,656 | 11/1973 | Serracchioli et al. | 340/172.5 |
| 3,842,405 | 10/1974 | Key et al. | 350/172.5 |

Primary Examiner—Melvin B. Chapnick
Attorney, Agent, or Firm—Nicholas Prasinos; Ronald T. Reiling

[57] ABSTRACT

A control system for a variable speed peripheral device which is suitable for remote as well as for local connection of the peripheral device to a central processor. For remote connection, the central processor is coupled to the peripheral device by way of a transmission controller, a remote communication line, and the control system connected to the peripheral device. First and second modems terminate the communication line and are connected through standard interfaces to the transmission controller and to the control system respectively. For this connection, the character transmission rate must be lower than, or equal to, the minimum operating speed of the peripheral device. For local connection, the central processor is coupled to the peripheral device by way of the transmission controller, the control system and the standard interface connected thereto. The latter interface further includes a special output lead connected to indicate the status of the peripheral device to the transmission controller in response to signals received from a control circuit internal to the control system. The transmission controller is thus enabled to transfer data to the peripheral device in the local connection at a rate that varies to meet the instantaneous requirements of the peripheral device. The average transmission rate thus exceeds the transmission rate for remote connection which must conform to the minimum operating speed of the peripheral device.

6 Claims, 7 Drawing Figures

CONTROL DEVICE FOR LOCAL CONNECTION OF A PERIPHERAL UNIT THROUGH A MODEM INTERFACE FOR REMOTE CONNECTION

BACKGROUND OF THE INVENTION

Field of Use

The present invention relates to systems for data processing and specifically to means for connecting peripheral appartus to a central processor.

Prior Art

It is known that peripheral apparatus such as teleprinters, (usually adapted for receiving and transmitting data, and therefore provided with a keyboard), and electronic display devices, may be connected to data processing systems, and specifically to the central processor of such systems, by means of telephone lines, modulating and demodulating devices called "modems", and data transmission controllers. Connections of this type are called "remote connections" as opposed to "local connections" wherein the peripheral devices directly connect to the central processor through peripheral control units without the interposition of modems and long distance lines.

A common characteristic of remote connections is the fact that the connecting lines, e.g. telephone lines, may vary in length from a few miles up to thousands of miles. Accordingly, these connections may not be ued efficiently, at least at character level, in an asynchronous mode, that is according to a "request and response" procedure. Instead, they are used in a rigid timing mode, in which both of the devices involved in the information exchange must be capable of accepting data. In other words, when a central processor sends a sequence of character codes to a remote terminal through a data transmission controller, the codes are not sent one by one in response to specific requests of the remote terminal, but are sent in continuous sequences according to the timing imposed by the controller and at a transmission speed acceptable to the remote terminal.

On the other hand, in local connections it is usually the peripheral unit which requests, by means of proper signals, the sending of the character codes according to its own timing requirements. Therefore, the constraints imposed by the connections of the local type have led to the design, in prior art systems of a range of control devices distinct from the control devices used for remote connections.

The above distinction is valid also at interface levels since interfaces for modems have long been standarized. That is, the functional and mechanical characteristics of the leads connecting a modem on one side to the transmitting apparatus and on the other side either to a peripheral device or to a data transmission controller, have long been specified. Conventionally, these interfaces are not employed in the local connections which make use of different devices having different and usually more complex interfaces.

Accordingly, it is an object of the present invention to provide a control system for peripheral devices adapted for both remote connection and local connection and having a mode of operation typical of local connections.

SUMMARY OF THE INVENTION

According to one aspect of the present invention, a control system is provided having a standard interface for modem connections, which is employed for local connections according to specific operating modes that allow it to obtain the advantages of a local connection for data transmission. According to another aspect of the invention, the present control system allows the operation of peripheral units both in local and in remote connection and in particular printers of asynchronous type, that is those characterized by instantaneously variable printing speed.

In accordance with the present invention, the peripheral unit is operated at a constant speed when remotely connected, equal to its own minimum instantaneous speed; whereas in its local connection, the peripheral unit is operated at a variable speed equal to the effective variable instantaneous speed of the peripheral unit.

These and other features and advantages of the present invention will appear more clearly from the following description of a preferred embodiment of the invention when considered in connection with the accompanying drawings.

DESCRIPTION OF THE PREFERRED EMBODIMENT

For a better understanding of the invention, it is convenient to briefly describe a standard interface which may be connected between a terminal control unit and transmitting apparatus. An interface of the type under consideration here is described in a technical report dated August 1969, issued by the Electronic Industries Association under the serial number RS - 232 - C.

Figure 3:
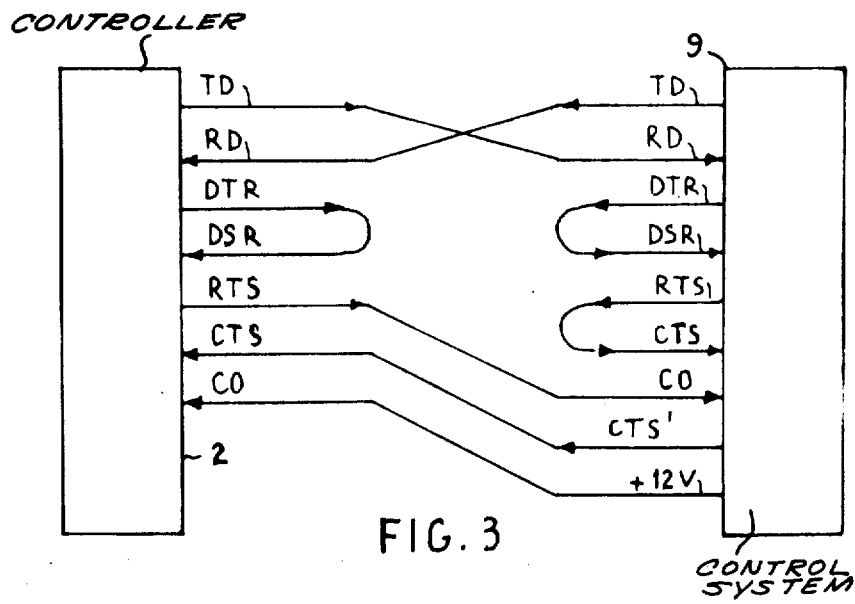
FIG. 3 is a simplified diagram of a standard data transmission interface and the connected units for local connection.

As shown in FIG. 3, the interface comprises a number of auxiliary leads which are not pertinent to an understanding of the invention. The main leads of the interface are as follows:

Lead TD: Transmitted Data.
Lead RD: Received Data.
Lead RTS: Send Request.
Lead CTS: Ready to Send.
Lead DSR: Modem Ready.
Lead DTR: Terminal Ready.
Lead CO: Carrier on line.

Figure 1:
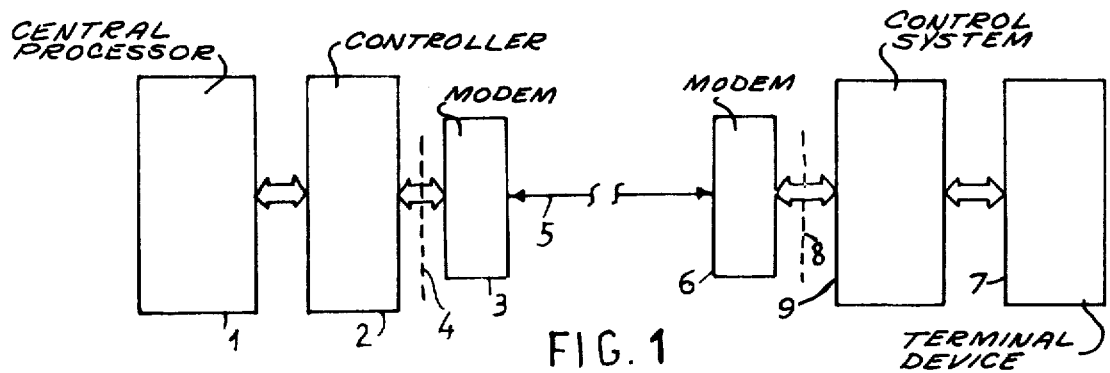
FIG. 1 shows in schematic form the arrangement employed for data transmission in remote connection.

FIG. 1 shows schematically the transmission system for remote connection. The system comprises a central data processor 1, a data transmission controller 2, connected to the central processor, a first send-receive apparatus ("Modem") 3, connected to the data transmission controller through an interface 4, a transmission link, for instance a telephone line 5, a second modem 6 connected to a control system 9. A remote terminal device 7, which normally incorporates the unit 9, is shown separately connected to the latter for ease of explanation through an interface 8. The interfaces 4 and 8 are identical and comprise the above listed leads.

Considering the interface 4 with reference to FIGS. 1 and 3, the functions of the different leads are as follows for remote connection.

The data signals are serially transmitted from the controller 2 to the modem 3 on lead TD. The data signals are serially received by the controller 2 from the modem 3 on lead RD. The lead RTS is employed for sending a signal from the controller 2 to the modem 3 requesting the transmission of data and for enabling the modem 3 for the transmission.

The lead CTS is employed for sending a signal from modem 3 to the controller 2 informing the conroller 2 that the modem 3 is ready for transmission. The lead DSR, (although shown for local connection in FIG. 3), is employed in remote connection for sending a signal from modem 3 to controller 2 informing the controller 2 that the modem is connected to the transmission line 5. The lead DTR, (similarly shown for local connection in FIG. 3), is employed in remote connection for sending a signal from controller 2 to modem 3 for activating the connection of the modem to the line 5. The lead CO is employed for sending a signal from modem 3 to controller 2 informing the controller 2 that the carrier frequency is effectively present on the line 5.

The function of the leads of the interface 8 is identical to that described above wherein the control system 9 replaces the controller 2 and the modem 6 replaces the modem 3.

The information exchange for initiating a data transmitting operation, for instance under request of the controller 2, follows the sequence hereafter described. The controller 2 brings the signal on the lead DTR to a steady binary level 1 thus requiring the connection of the modem 3 to the line 5. As soon as the connection is effected, the modem 3 answers by bringing the signal on the lead DSR to steady level 1. The controller 2 brings the signal on the lead RTS to steady level 1 for enabling modem 3 to transmit.

As soon as the modem 3 detects the presence of the carrier frequency on the telephone line, it brings the signal on the lead CTS to a binary level 1 to inform the controller 2 that the information transfer may begin. At the same time, the receiving modem 6 brings the lead CO to level 1 to indicate the presence of the carrier frequency on the line. At this point, the controller 2 starts to send the data serially on the lead TD.

Figure 2:
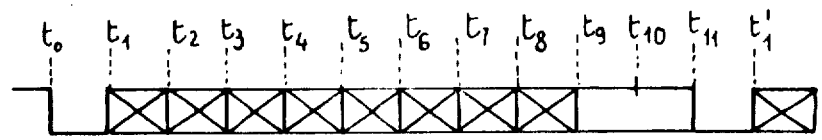
FIG. 2 is a timing diagram showing the form of the transmitted data.

The structure of the transferred data, in case of asynchronous transmission, as will now be considered, is shown by FIG. 2. In the rest condition, the signal on lead TD is at binary level 1. At the initial instant $t_0$, and for an elementary time interval $t_0-t_1$, the signal is brought to level 0. During the following eight elementary time intervals defined by the instants $t_1-t_9$, all of them equal in length to $t_0-t_1$, the signal may be at level 1 or 0, thus forming a serial binary code of 7 bits, plus a parity check bit. The last significant interval $t_8-t_9$ is followed by two elementary intervals $t_9-t_{10}$ and $t_{10}-t_{11}$ in which the signal is kept at level 1.

The 0 level interval $t_0-t_1$ is a "Start" bit, i.e. a timing signal which is employed by the receiving device for synchronizing the receiving operations during the following time intervals. The 1 level interval $t_9-t_{11}$ is a "Stop" signal, of 2-bit length, which allows the completion of the receiving operations of the binary character code. From the instant $t_{11}$ on, if needed, a new code may be sent, always preceded by a Start interval $t_{11}-t_1'$.

The duration of the elementary transmission intervals is determined by the controller 2 by means of an internal timing device and defines the transmission speed in bits per second. For instance, if the transmission speed is 600 bits per second, each elementary interval has a length of 1.66 milliseconds. Many existing controllers may selectively determine, either in response to a command or by predisposition, different transmission speeds, for instance, 300, 600 or 1800 bits per second.

It will also be noted that the existing controllers, when sending out the character codes at the selected speed, are provided with devices for interrupting the transmission after completing the character transmission when a falling off of the signal CTS on the corresponding lead is detected. In normal operation this signal sent by the modem may fall off because of disturbances which temporarily attenuate or remove the carrier frequency from the line. To obviate interruptions of data transmission caused by such disturbances, when the CTS signal is missing or falls off for a time interval less than a predetermined duration, e.g. measured in seconds, transmission is resumed by sending out the next character code. If the predetermined time interval is exceeded, transmission is discontinued.

According to the invention, the above operational characteristics of the data transmission controller and of the standard interface, are utilized to advantage in order to make use of the same controllers and the same interface for local connections. That is, in case where no modems are connected, the control system 9 in FIG. 1 is seen by the controller 2 as a modem. The ability to stop character transmission as the signal CTS falls off is conveniently utilized in the local connection for adapting the operation of the controller 2 to the time requirements of the peripheral device 7 which, in a preferred embodiment, incorporates the control system 9.

The FIG. 3 shows how the standard interface for connection to a modem is employed as interface for a local connection between the control system 9 and thence data transmission controller 2 and the peripheral device 7. No modification is required in controller 2, nor would such be necessary when using the different types of known controllers. The leads TD and RD are employed for the data interchange, and are, of course, crossed over. That is, the lead TD, as seen by the controller 2, is the lead RD as seen by the control system 9. The leads DTR which have the function of controlling the connection of the modems to the line, in case of local connection are not employed and may be loop-connected on both sides of the interface to the leads DSR of the same side, thus signalling a permanent line connection. In fact, in the local connection the line is always connected. The lead RTS on the side of the controller 2, which in case of a remote connection orders the modem to activate the connection link, simulates this function in case of local connection by its connection to the carrier-detecting lead CO on the side of the control system 9.

On the side of the control system 9, the lead CO may be also connected to the lead RTS or, preferably, to an output terminal of 12 V d.c. of the peripheral device. This delivers to the controller 2 a signal indicating that the voltage source of the peripheral device is "on" and the connection is therefore activated. On the side of the control system 9, the leads RTS and CTS are conveniently interconnected to simulate the permanent availability of the controller 2 to receive information.

Lastly, the most significant aspect of the invention is that the lead CTS on the side of the controller 2 is connected to an output lead indicated as CTS' on the side of the control system 9. On this lead a level 1 signal is sent, as long as the peripheral device 7, which is connected to the control system 9, may accept incoming information. When the device 7 cannot accept information, this signal goes down to 0 level. When this signal falls off which will hereafter be indicated by CTS', the controller 2 stops sending data until the signal goes up again.

Figure 4:
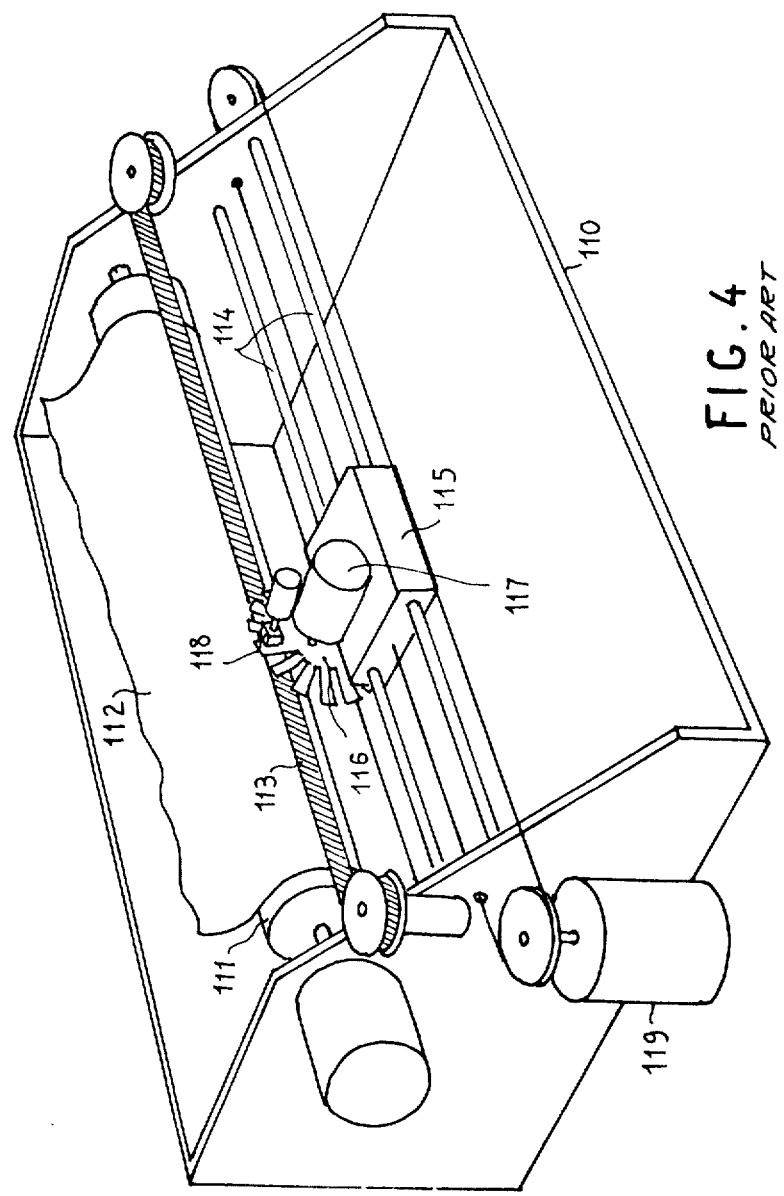
FIG. 4 shows in simplified form an example of a prior art peripheral printer.

The terminal device 7 may consist of any one of a number of different peripheral units. However, in order to illustrate the utility and the advantages of the present invention, it is convenient to refer to a specific peripheral apparatus, for instance to a printer and its electronic interface circuits. Printers of the serial asynchronous type, such as shown in FIG. 4 are well known in the art. The printer comprises, for example, a main frame 110, a platen 111 for supporting the print sheet 112, an inked ribbon 113 located in proximity of the print sheet and a set of guide members 114 on which the print carriage 115 slides. The print carriage 115 carries a print head 117, for instance of the "daisy" type wherein each separate character is fastened to the extremity of one of a plurality of blades 116, the blades being radially arranged.

The positioning of the character to be printed is accomplished by means of a stepping motor 119, and the actual printing is accomplished by operating a print hammer 118 which drives the selected blade against the inked ribbon and the print sheet, thus leaving an impression mark corresponding to the selected character on the sheet. The print carriage 115 is moved forward and backward along the print line by the stepping motor 119 which is coupled to the carriage 115 by suitable transmission members.

In a printer of this type, the printing speed is variable and is primarily limited by the character selecting time which in turn depends on the magnitude of the rotation angle which must be accomplished by the character carrying head 117 in order to bring the next desired character into printing position. In case of a small rotation angle, the operating speed is limited to move the time required by the carriage 115 from one print position to the following one since the carriage displacement and the character selection usually overlap in time. However, for large rotation angles the operating speed is reduced by a value dependent on the speed of rotation of the blades 116, down to a minimum fixed value. If the data code representative of the characters to be printed are delivered to the printer only at a speed equal to this minimum speed value, the full potential of the printer is not realized. If the data signals are delivered to the printer at a greater speed, the printer may not be able to correctly perform the sequence of printing operations.

It is therefore necessary to provide an arrangement for allowing the codes corresponding to the characters to be printed to be sent at a frequency which is variable in accordance with the effective instantaneous requirements of the printer. Such an arrangement which is known per se and is included in prior art interfaces exclusively used for local connections. According to the present invention, such an arrangement is used in combination with a standard interface for remote data transmission, and it permits controllers provided with standard interfaces for remote data transmission to be used for local connections as well. Accordingly, in such an arrangement the potential of the peripheral device is fully exploited.

Figure 5:
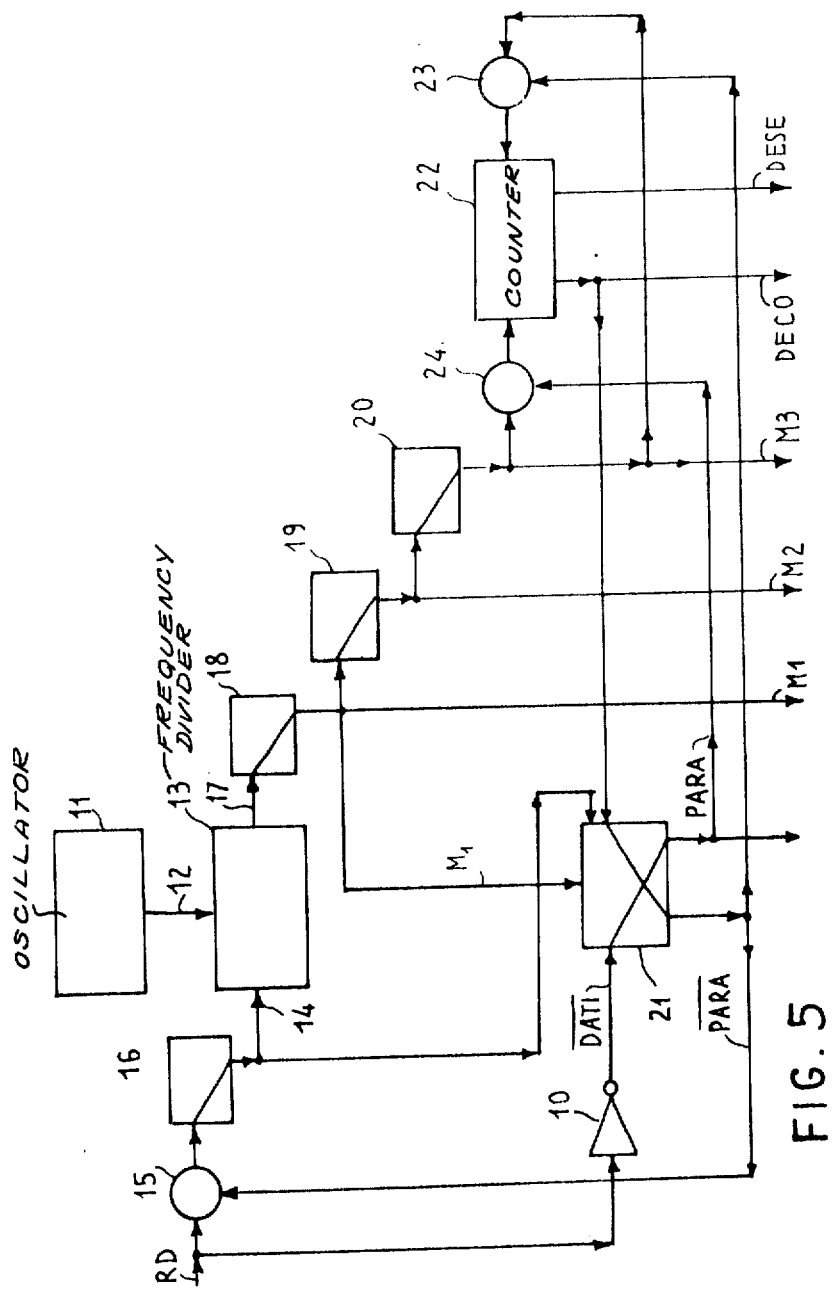
FIG. 5 is a simplified block diagram of the timing circuits employed in the control system of the present invention for controlling a peripheral device in local connection.
Figure 6:
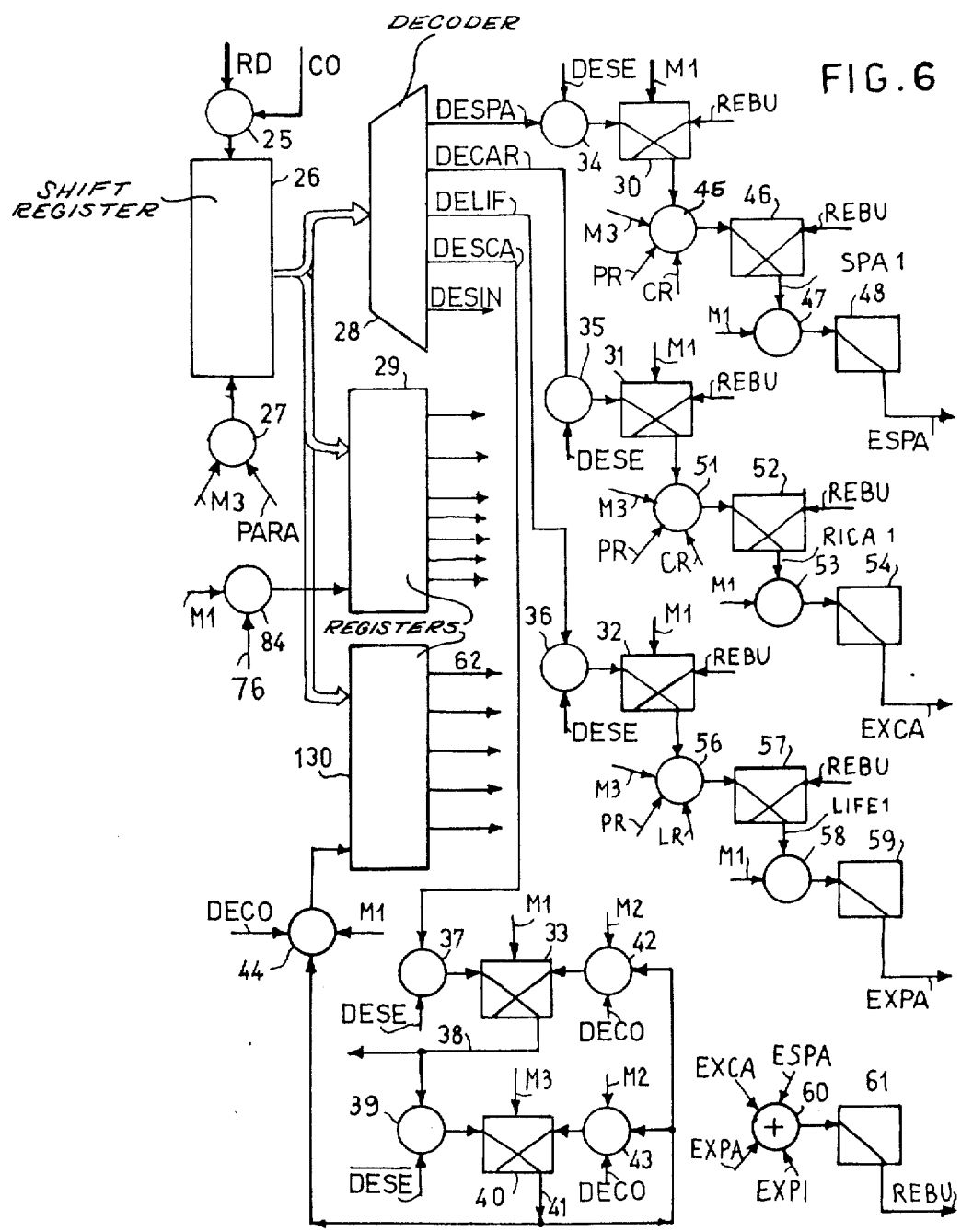
FIGS. 6 and 7 together show the logical circuits employed in the control system of the present invention for local connection.
Figure 7:
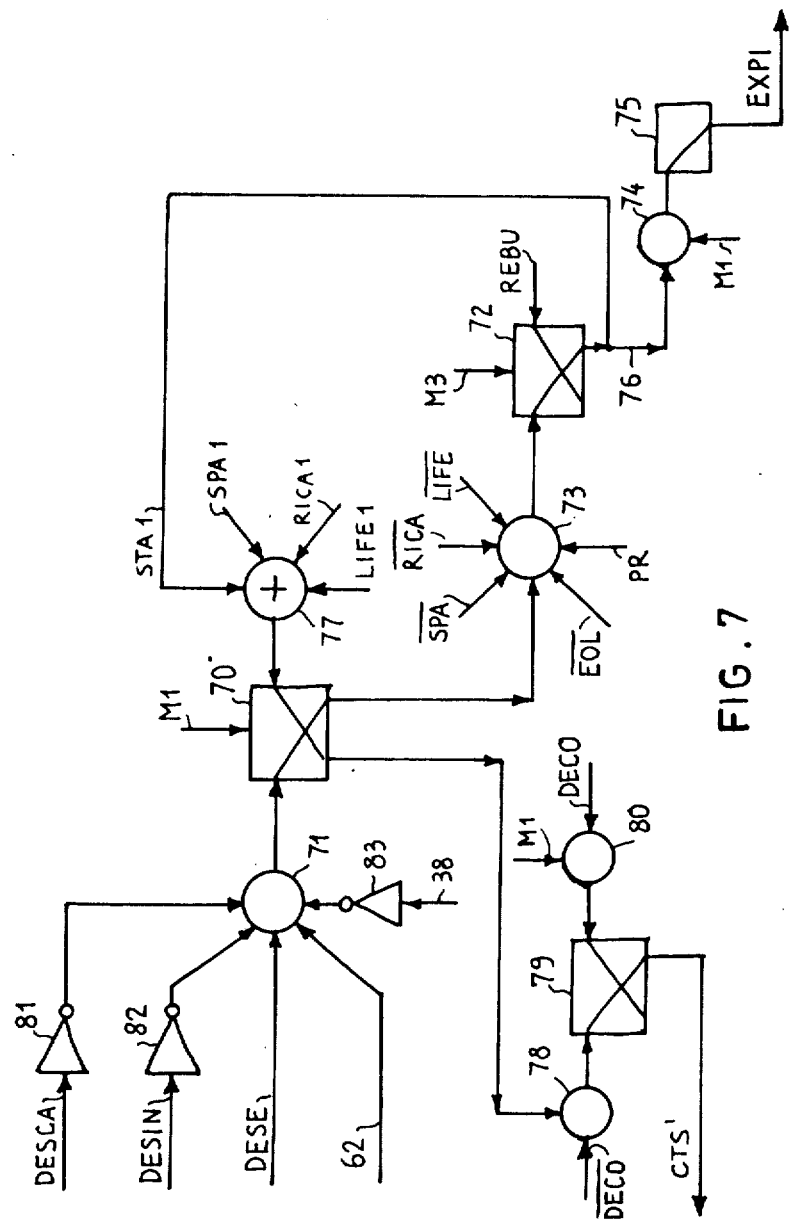

FIGS. 5, 6, and 7, together show a simplified block diagram of a portion of the electronic circuitry of the control system 9 used for local connection. As explained above, the control system 9, although separately illustrated in FIG. 1 for ease of explanation, is in actual practice normally incorporated into the circuitry of peripheral device 7. The explanation below is limited to the logic of the receiving circuitry which is sufficient for an understanding of the invention.

In order to facilitate the reading of the drawings, all of the plurality of existing electrical connections, which connect elements in one Figure to elements is another Figure, are not shown. Instead, different groups of reference letters are affixed to a number of incoming and outgoing signals for many functional blocks, thus allowing the easy identification of the electrical connections not shown. Lastly, no information is given about the manner of obtaining a number of signals generated at the interior of the peripheral apparatus during its operation, as these signals may be obtained by the use of techniques and circuits well known and further description is therefore not necessary to an understanding of the invention.

It is assumed, specifically, that the printer shown in FIG. 4 is capable of generating the following signals:

EOL which signals that the carriage has reached the end of the print line;

PR which signals that no print operation, inclusive of carriage advancement and character selection, is being executed;

LR which signals that no line feed operation is being executed; and,

CR which signals that no carriage advancement operation such as spacing or carriage return is being executed.

It is assumed that the printer is controlled by the following commands:

EXCA, for carriage return;

ESPA, for spacing;

EXPI, accompanied by a character code, for advancing the carriage, selecting and printing the character; and EXPA, for a line feed, that is, for advancing the print sheet.

It will be explained herein below how these commands are generated by the control system which is part of terminal device 7.

The Timing of the Receiving Operation.

With reference to FIG. 5, the timing of the receiving operation is obtained by a free running oscillator 11 which delivers a sequence of pulses at relatively short intervals T on the output lead 12. These pulses are applied to a frequency divider 13 which may be a cyclical counter. It delivers at the output 17 a pulse only when it reaches a state corresponding to the count of O + KN input pulses where K is an arbitrary integer and N is the counting capacity of the counter.

Therefore, for each sequence of input pulses, the counter will emit a pulse of duration equal to the interval T. The counting capacity N and the interval T are so chosen that the interval between emitted pulses is equal to the duration of each transmitted bit. N, for instance, may be equal to 8. The counter 13 is provided with a reset input 14. This input is employed for synchronizing the counting operation with the reception of the data on the lead RD, as seen from the circuitry of the peripheral unit 7.

The timing of the reception of data is obtained as follows. The falling edge of the signal DATI on the lead RD, corresponding to the reception of the Start bit (instant $t_0$ of FIG. 2) triggers by means of the AND gate 15, enabled by a signal $\overline{PARA}$, the one-shot 16 which delivers a short pulse $\tau$ at its output.

This pulse is applied to the reset input 14 of the counter 13 which delivers at its output 17 a pulse of a duration equal to the duration of the pulse $\tau$, plus, if any, the waiting time for a first pulse from the oscillator 11 to be applied to the counter input. Afterwards, in the preferred embodiment where $N=8$, a pulse of duration equal to the interval T is delivered after each eight pulses applied to the counting input 12. These output pulses are applied to three one-shot circuits 18, 19 and 20, series connected, for generating a succession of three pulses $M_1$, $M_2$ and $M_3$ respectively, which are employed for timing the receiving circuitry and which fall approximately at the center of the interval corresponding to each bit on the lead RD.

The absence of the signal $\overline{PARA}$, generated by a flip-flop 21, prevents any falling edge of the signal on lead RD, following the first one, from causing the resetting of the counter 13. When the flip-flop 21 is in its "reset" state, its inverted output is at binary level 1, that is signal $\overline{PARA}$ is present at this output. When the flip-flop 21 is in the "set" state, its direct output is at binary level 1, that is, a signal PARA is present at this output. The flip-flop 21 in response to a clock pulse $M_1$, is set by a signal $\overline{DATI}$ (inverted DATI) applied to the set input through an inverter 10, and is reset by a signal DECO applied to the reset input whose origin will be explained herein. In addition, the flip-flop 21 may be reset by a signal applied to the direct reset input.

Initially, the flip-flop 21 is in its "reset" state and therefore the signal $\overline{PARA}$ is present and the AND gate 15 is enabled. The pulse $\tau$ generated by the one-shot 16 is applied to the direct reset input of flip-flop 21 which is maintained in reset state for the whole duration of the pulse. This duration is such as to encompass any one of the pulses $M_1$, $M_2$, $M_3$ already being generated.

As soon as $\tau$ falls off, the counter 13 is reactivated, and a first pulse $M_1$ is generated. At this moment, the signal $\overline{DATI}$ is present because the signal on the receiving line is the Start bit which has a level 0. Therefore, the flip-flop 21 is set and the signal $\overline{PARA}$ falls off preventing any possible following falling edge of the DATI signal from triggering the one-shot 16.

The timing circuit is completed by a counter 22 which is reset by a pulse $M_3$ when the AND gate 23 is enabled by the signal $\overline{PARA}$. The counter increments in response to the pulses $M_3$ applied to the clock input through the AND gate 24 when the gate is enabled by the signal PARA. The pulses $M_1$, $M_2$ and $M_3$, as mentioned, are generated in continuous sequence by the action of the free running oscillator 11. Therefore, initially the counter 22 is in its reset state because the signal $\overline{PARA}$ enables the AND gate 23. However, as soon as the flip-flop 21 is set, the counter 22 increments due to the sequence of the pulses $M_3$ in the presence of the signal PARA. When the counter 22 has counted 8 pulses $M_3$, this indicates that the receiving circuit has received the Start bit and the 7 information bits of a character code and a first signal DESE is generated. At the reception of the ninth pulse $M_3$, a second signal, DECO is generated and the signal DESE returns to 0.

The signal DECO is applied to the clocked reset input of the flip-flop 21, which at the reception of the following $M_1$ pulse, that is in coincidence with the first Stop bit, is reset which generates the signal $\overline{PARA}$. Immediately afterwards, the following pulse $M_3$ also resets the counter 22. The subsequent sending on the lead RD of a next code, preceded by the Start bit, renews the already described sequence.

As long as a new Start bit is not received, the pulse $M_1$ does not change the state of the flip-flop 21 because the signal $\overline{DATI}$ is absent. Similarly, the pulse $M_3$ does not change the state of the counter 22 because the signal PARA is absent and the signal $\overline{PARA}$ is present. The arrows on the lines marked by the symbols $M_1$, $M_2$, $M_3$, DECO, DESE, and PARA indicate that these signals are sent to the remaining sections of the receiving circuitry.

The Receiving Logic Circuits

With reference to FIG. 6, it is seen that the receiving circuits comprise a first AND gate 25 having the inputs connected to the leads RD and CO, and the output connected to the serial input of a shift register 26 having a 8-bit capacity. The shift register 26 is stepped by a clock signal consisting of the pulses $M_3$ transferred through the AND gate 27 when it is enabled by the signal PARA.

The data signals present on lead RD when the signal on lead CO is at level 1 are serially loaded into register 26 beginning with the Start bit. At the reception of the ninth pulse $M_3$, all the eight significant bits of a code, parity bit included, are loaded in the shift register 26.

The eight parallel output leads of the register 26 are connected to a decoder 28 and to two registers 29 and 130, both having a capacity of 8 bits.

The function of the decoder 28 is to recognize, among the different codes received, the service codes and to generate a level 1 signal on specific leads, one for each service signal. Service codes are those codes which control specific operations of the peripheral apparatus. For instance, in the example of a serial printer, the operations of Spacing, Carriage Return and Line Feed are controlled by specific service codes. Another service code is, for instance, a code named ESCAPE which specifies that one or more subsequent codes have the meaning of control codes. For instance, the first code following the ESCAPE code may signify whether the printing must be red or black, or whether the keyboard, if any, associated with the printer must be enabled, or whether other peripheral devices, possibly associated with the printer such as optical displays, tape punchers, magnetic incremental recorders and so on, must be activated.

To limit the description to the more significant aspects of the invention, it is assumed that the following service codes are provided which correspond to the indicated signals:

Spacing (DESPA);
Carriage Return (DECAR);
Line Feed (DELIF);
Escape (DESCA); and, Filling (no character printed) DESIN.

For each service code, the signal generated by the decoder 28 and employed is indicated in FIG. 6.

When the register 26 is loaded, the signals corresponding to recognized service codes are loaded into the corresponding ones of the flip-flops 30, 31, 32 and 33. Only one of these signals is present at a time. This operation is performed when the signal DESE enables the respective AND gates 34, 35, 36 and 37, and in response to the timing pulse $M_1$, that is in the elementary time interval comprised by two consecutive $M_3$ pulses, when the shift register 26 contains the Start bit and the significant data bits, but not the parity check bit. The decoder 28 is arranged to take into account this condition.

The different flip-flops 30, 31, 32 and 33 generate condition signals for the receiving logic circuits. Let us consider first the code ESCAPE. When this code is recognized and the signal DESCA is generated, the flip-flop 33 is set and a signal is delivered on the lead 38. This signal is applied to the AND gate 39, which is enabled by the signal $\overline{DESE}$ generated from the signal DESE by an inverter, not shown. The output signal of gate 39 sets the flip-flop 40 in response to a clock pulse $M_3$. This happens at the reception of the first Stop bit of the ESCAPE code. At this moment, the signal DECO, as mentioned, falls to level 0 and remains at this level until the last bit (i.e. parity check bit) of the following code is received.

The output 41 of flip-flop 40, the signal DECO and the pulse $M_1$ are applied to the corresponding inputs of the AND gate 44 whose output delivers a clock signal for loading the register 130. Therefore, the code following the ESCAPE code, after being received and loaded into the register 26, is transferred to the register 130 in response to the signals generated by the flip-flops 33 and 40. Both flip-flops 33 and 40 may be reset at the same time by the presence of the signal at the output 41 of the latter flip-flop, the clock pulse $M_2$, and the signal DECO applied to the reset inputs through the AND gates 42 and 43.

The content of the register 130 is modified only upon the reception of a new ESCAPE code, its output signal specifying the operations to be performed on the data to be subsequently received, for instance, whether the printing will be black or red, continuously or at intervals, and whether other peripheral apparatus must be activated. This information is sent by proper leads to the respective circuits controlling such operations which, for the sake of simplifying the explanation, are not described herein and are not within the scope of the invention. For example, a signal on the lead 62 will indicate that the printer is selected and enabled to print.

The signal DESPA corresponding to the code SPACE will now be considered. This signal sets the flip-flop 30. The signal on the direct output of flip-flop 30 sets the flip-flop 46 through the AND gate 45 which is enabled by the clock pulse $M_3$ and by the signals PR and CR respectively, indicative of the fact that no printing operation and no carriage displacement operation are being performed. The direct output of flip-flop 46, applied through the AND gate 47 when the latter is enabled by the clock pulse $M_1$, triggers the one-shot 48 which generates a command pulse ESPA for executing a spacing operation.

In the same way, the CARRIAGE RETURN code, when recognized, generates a signal setting the flip-flop 31. The signal at the direct output lead of flip-flop 31, applied through the AND gate 51, which is enabled by the clock pulse $M_3$ and by the signals PR and CR, indicates that no printing operation and no carriage displacing operation are being performed and sets the flip-flop 52. The direct output of flip-flop 52 applied through the AND gate 53, which is enabled by a clock pulse $M_1$, triggers the one-shot 54 to generate a pulse EXCA which controls the Carriage Return operation. Similarly, the code LINE FEED, when recognized, sets the flip-flop 32. The direct output of the latter, applied through the AND gate 56 when enabled by the clock pulse $M_3$ and by the signals LR and PR, indicates respectively that no Line feed operation and no printing operation is in progress and sets the flip-flop 57. The output of flip-flop 57, applied through an AND gate 58 when the latter is enabled by a clock pulse $M_1$, triggers the one-shot 59 which delivers a pulse EXPA commanding the line feed operation.

In addition to the previously described operations, the pulses ESPA, EXCA, EXPA, and a print command signal EXPI whose generation, will be explained herein below, are applied through an OR gate 60 to trigger a one-shot 61 which generates at its output a pulse REBU which resets the flip-flops 30, 31, 32, 46, 52 and 57.

It will now be explained how the printing command EXPI is generated and how the peripheral device, when in its local connection, controls the reception of the data through the standard interface in accordance with its own time requirements. The electronic circuits provided for this purpose are shown in FIG. 7.

A flip-flop 70 is set by a pulse $M_1$ when a number of conditions are simultaneously present. These are: the presence of the signal DESE, the absence of the signal DESIN, generated by the recognition of the code FILLING, the absence of the signal DESCA, corresponding to the ESCAPE code, the presence of a signal on lead 62 enabling the printing apparatus, and the absence of a signal on lead 38, the direct output of the flip-flop 33 of FIG. 6, indicating that the code loaded in the register 26 is a control code, following an ESCAPE code. Signals corresponding to all these conditions are applied to the set input of flip-flop 70 through the an AND gate 71 and inverters 81, 82 and 83. This means that the flip-flop 70 is set when the register 26 contains either a character to be printed or a code corresponding to a command of SPACING, CARRIAGE RETURN, LINE FEED, and the printer is enabled to print. In this case, the direct output of the flip-flop 70 switches to binary level 1. This direct output of the flip-flop 70 is connected to a set input of a second flip-flop 72 through an AND gate 73.

The flip-flop 72 is set by the reception of a pulse $M_3$ only if a number of conditions are simultaneously present, namely, the code contained in the register 26 must not be a SPACING, CARRIAGE RETURN or LINE FEED code, that is the signals $\overline{SPA}$, $\overline{RICA}$ and $\overline{LIFE}$, respectively obtained from the inverted outputs of the flip-flops 30, 31 and 32 of FIG. 6, must be present. In addition, the printer must not signal that the carriage is at the end of the print line and therefore the signal EOL indicating this condition must be present. Further, the printer must be enabled to print, which means that any preceding printing operation must have been completed, this condition being indicated by the presence of the signal PR.

When the flip-flop 72 is set, its direct output 76 delivers a signal STA 1 which applied through an AND gate 74 when enabled by a pulse $M_1$, triggers a one-shot 75 which generates a command pulse EXPI for performing the print operation.

The output 76 of the flip-flop 72, applied through the AND gate 84 (FIG. 6) when enabled by a pulse $M_1$, also transfers the code contained in register 26 to register 29 of FIG. 6. This register is employed for storing the information during the time it is needed for printing.

The outputs of the register 29 deliver suitable signals to the electro-mechanical equipment of the peripheral apparatus for selecting the character to be printed. The flip-flop 72 is reset by the pulse REBU (See FIG. 6) generated by the one-shot 61. The flip-flop 70, on the other hand, is reset by any one of the signals SPA 1, RICA 1, LIFE 1 and STA 1, generated by the direct outputs of flip-flops 46, 52, 57 and 72 respectively, applied to the reset input through the OR gate 77 in coincidence with the clock pulse $M_1$.

The inverted output of flip-flop 70 is applied through an AND gate 78 to the set input of a flip-flop 79. The AND gate 78 is enabled by the signal $\overline{DECO}$. Therefore, the flip-flop 79 is set by the presence of a signal on the inverted output of the flip-flop 70 and the presence at the same time of the signal $\overline{DECO}$. The flip-flop 79 is reset via its reset input by the signal DECO applied to an AND gate 80 in coincidence with a pulse $M_1$. The direct output of the flip-flop 79 is connected to the interface lead CTS'. The function of the flip-flops 70 and 79 is that of generating a signal CTS' on this lead only when the peripheral device is in a condition to receive information.

The operation of the circuit shown in FIg. 7. will now be considered. Initially both the flip-flop 70 and the counter 22 of FIG. 5 are in a reset state. Therefore, the signal $\overline{DECO}$ and the inverted output of the flip-flop 70 are both at level 1 and the flip-flop 79 is set. Therefore, a signal CTS' is present on the interface lead informing the controller 2 that the peripheral apparatus is in condition to receive data. At this moment, the controller 2 may start sending information in serial code form and its reception activates the timing and receiving circuits. The first code sent on the line is an ESCAPE code. It has no effect on the flip-flop 70 which remains reset. It increments the counter 22 and therefore, upon the reception of the parity check bit of this code, the signal DECO goes up and the signal $\overline{DECO}$ goes off, thus resetting the flip-flop 79 at the instant $M_1$. The signal CTS' goes off.

However, in response to the signal $M_3$ following almost immediately (after an interval of less than a microsecond), the resetting of the counter 22 causes the signal $\overline{DECO}$ to reappear and the signal DECO to go off. The flip-flop 79 is thus set again. The signal CTS' therefore goes off only for a short interval, equal to the interval between a pulse $M_1$ and the following pulse $M_3$ during the reception of the Stop bit. Therefore, when the sending and the receiving of the Stop bits are completed, the signal CTS' is present on the interface and the controller 2 may send immediately the following control code. Even this code has no effect on the flip-flop 70, and therefore may be followed by the immediate transmission of a new code.

It is assumed that now a service code is sent, for instance, a CARRIAGE RETURN code. When this code is recognized, the flip-flop 70 is set. The flip-flop 79 remains reset and the signal CTS' remains at logical level 0. However, as soon as the command is accepted, that is, when the preceding printing or carriage displacing operations are completed, the flip-flop 52 is set, the signal RICA is generated and the flip-flop 70 is reset. On the interface lead the signal CTS' reappears, and a new code may be sent by the controller 2. Similarly, for spacing, line feed or character printing signals, the operation is effectively started only after the completion of the preceding operations which, when in progress, prevent its execution. During the waiting time, the signal CTS' falls off.

The use of the signal CTS' for signalling to the controller 2 the ability to receive data, therefore allows the transfer of the data to be conditioned to the effective time requirements of the peripheral device. Therefore, it is possible to employ a data transmission controller having a modem interface which operates at a data transfer speed higher than the operating speed of the peripheral device by varying the interval between the start of two consecutive codes according to the variable instantaneous speed of operation of the peripheral device, thus integrally using to advantage the performance of the apparatus itself in local connection.

In case of remote connection, it is clear that the described arrangement cannot be employed in that it is necessary to operate at a lower transmission speed which takes into account the maximum foreseeable operating time of the device. However, it is possible when using a high transmission speed to "fill in" between the transmission of desired information a convenient number of FILLING codes. These have no operating effect on the peripheral apparatus, but they allow the delivery of the desired information to the peripheral apparatus at a frequency acceptable by the latter. These FILLING codes may for instance be inserted in the transmitted message by a program which places the message in a suitable format.

In the above description, reference has been made to a peripheral device for controlling an asynchronous printer whose variable speed is caused by the variation in the time needed for positioning the character carrying head. It is self-evident that the invention may also be employed with types of asynchronous printers, for example mosaic printers wherein the variable speed is caused by the fact that the printer carriage must be displaced from one position to the following one by an intermittent motion, or by a continuous displacement across a plurality of printing positions.

The invention is also applicable to any other type of peripheral apparatus such as magnetic recorders, tape or card punches wherein it is possible to have an instantaneous variable operating speed, according to the circumstances. In these cases, obvious circuit modifications may be made to the peripheral control device without departing from the spirit and scope of the invention.

What is claimed is:

1. An electronic control system for locally connecting a peripheral device to a control unit adapted to control the transmission of information signals to a remote terminal, said control system comprising:

means connecting said control system to said peripheral device, a standard modem interface including a plurality of leads coupling said control system to said control unit and adapted for remote signal transmission, said interface further including a special lead;

and circuit means coupled to said special lead and to said peripheral device, said circuit means being responsive to signals representative of the operating conditions of said peripheral device to provide one of two distinct electrical signal levels on said special lead for signaling to said control unit the state of readiness of said peripheral device to receive said information signals.

2. An electronic control system for locally connecting a peripheral device for reception of binary coded signals from a transmission control unit, said system comprising:

a standard modem interface including a plurality of leads coupled to said peripheral device for reception of said binary coded signals;

said interface further including a special interface lead;

means for providing control signals, said means including a shift register coupled to one of said plurality of leads for serially registering indications of said binary coded signals applied thereto;

timing means coupled to said shift register for synchronizing the reception of said coded signals with respect to their transmission speed determined by said transmission control unit;

and circuit means responsive to said timing means and to said control signals, said circuit means being coupled to said peripheral device and to said special lead for applying one or the other of two electrical signal levels to said special lead in response to signals representative of the operating conditions of said peripheral device, said transmission control unit being coupled to said special lead and being responsive to one of said electrical levels to interrupt the transmission of said binary coded signals on said one of said plurality of leads.

3. An electronic control system for both remote connection of a peripheral device to a data processing system by a transmission line coupled to a modem at each end, as well as for local connection of said peripheral device to said data processing system in the absence of said modems, comprising:

a standard modem interface including a plurality of leads coupled to said peripheral device for connection to one of said modems and adapted for the reception of first signals from said data processing system;

said interface further including an additional interface lead;

and circuit means coupled to said peripheral device and to said additional lead, said circuit means being responsive to second signals representative of the operating conditions of said peripheral device for applying one of two electrical signal levels to said additional lead indicative of the capability of said peripheral device to accept said first signals.

4. The electronic control system of claim 3 and further including;

serial storage means coupled to a first one of said plurality of leads of said standard for receiving said first signals;

timing means coupled to said serial storage means for timing the serial registration of said first signals by said storage means as binary coded characters at the rate of transmission of said data processing system;

and decoder means coupled to said storage means for generating control signals in response to the storage of characters indicative of operations required to be performed by said peripheral device;

said circuit means including logic control means coupled to said decoder means and to said peripheral device responsive to said control signals and to said second signals for applying one of said two electrical signal levels to said additional interface lead.

5. A control system for connecting a peripheral device to a transmission control unit adapted to control the transfer of information signals from a connected data processing system, said transmission control unit being provided with a first standard modem interface including a plurality of leads, said first interface further including a special lead adapted to receive a bilevel signal either in remote connection through a pair of modem units and an intermediately connected communication line, or directly in local connection, said bilevel signal being representative of the cabability of said peripheral device to accept said information signals;

a second standard modem interface for coupling said peripheral device through a corresponding plurality of leads to one of said pair of modem units or to said transmission control unit, said second interface including an additional interface lead for connection to said special lead in said local connection, and circuit means coupled to said additional lead and to said peripheral device and responsive to signals representative of the operating conditions of said peripheral device for applying one of two distinct levels of said bilevel signal to said additional lead.

6. A control system as recited in claim 5 and further including serial storage means coupled to a first one of said plurality of leads of said second interface for receiving said information signals, timing means coupled to said serial storage means for timing said storage means to serially register said information signals as binary coded characters at the rate of transmission of said data processing system, and decoder means coupled to said storage means for generating control signals in response to the storage of characters indicative of operations required to be performed by said peripheral device, said circuit means including logic control means coupled to said decoder means and to said peripheral device and controlled by said timing means, said logic control means being responsive to said control signals and to said signals representative of the conditions of said peripheral device.

* * * * *